(12) United States Patent
Beckley et al.

(10) Patent No.: US 7,185,535 B2
(45) Date of Patent: Mar. 6, 2007

(54) TIRE SENSOR INTERROGATION AND VALVE THEREFORE

(75) Inventors: John Peter Beckley, Bicester (GB); Victor Alexandrovich Kalinin, Headington (GB)

(73) Assignee: Transense Technologies PLC (GB)

( * ) Notice: Subject to any disclaimer, the term of this patent is extended or adjusted under 35 U.S.C. 154(b) by 45 days.

(21) Appl. No.: 10/514,962

(22) PCT Filed: May 20, 2003

(86) PCT No.: PCT/GB03/02178

§ 371 (c)(1),
(2), (4) Date: Nov. 18, 2004

(87) PCT Pub. No.: WO03/097386

PCT Pub. Date: Nov. 27, 2003

(65) Prior Publication Data

US 2005/0172708 A1 Aug. 11, 2005

(30) Foreign Application Priority Data

May 21, 2002 (GB) ................................. 0211663.0

(51) Int. Cl.
*B60C 23/02* (2006.01)
(52) U.S. Cl. .................................................. 73/146.8
(58) Field of Classification Search ................. 73/146, 73/146.5, 146.8
See application file for complete search history.

(56) References Cited

U.S. PATENT DOCUMENTS

| | | | |
|---|---|---|---|
| 3,881,170 A | 4/1975 | Hosaka et al. | |
| 4,137,520 A | 1/1979 | Deveau | |
| 5,063,774 A | 11/1991 | Burkard et al. | |
| 5,348,067 A | 9/1994 | Myatt | |
| 6,101,870 A * | 8/2000 | Kato et al. | 73/146.8 |
| 6,340,929 B1 * | 1/2002 | Katou et al. | 340/447 |
| 6,543,277 B2 * | 4/2003 | Koch et al. | 73/120 |
| 6,722,191 B2 * | 4/2004 | Koch et al. | 73/146 |
| 6,799,455 B1 * | 10/2004 | Neefeldt et al. | 73/146 |
| 2002/0046599 A1 | 4/2002 | Chuang et al. | |
| 2003/0150261 A1 * | 8/2003 | Koch et al. | 73/146 |

FOREIGN PATENT DOCUMENTS

| | | |
|---|---|---|
| DE | 39 06 399 | 9/1990 |
| EP | 0 505 906 | 9/1992 |
| EP | 0 657 836 | 6/1995 |
| EP | 0 875 405 | 11/1998 |
| WO | WO 94/00306 | 1/1994 |
| WO | WO 96/26076 | 8/1996 |
| WO | WO 01/12452 | 2/2001 |

* cited by examiner

*Primary Examiner*—Edward Lefkowitz
*Assistant Examiner*—Andre Allen
(74) *Attorney, Agent, or Firm*—Keusey, Tutunjian & Bitetto, P.C.

(57) ABSTRACT

A system for interrogating a tire sensor. The disclosure provides a wheel (2) including a sensor (14) and an electrical conductor (18, 20) extending about a rotational axis (4) of the wheel (2), the sensor (14) being electrically coupled to said electrical conductor (18, 20). Communication between the sensor and a remote interrogating apparatus is thereby improved.

14 Claims, 2 Drawing Sheets

TIRE SENSOR INTERROGATION AND VALVE THEREFORE

TECHNICAL FIELD OF THE INVENTION

The present invention relates to a system for interrogating a tire sensor.

DESCRIPTION OF RELATED ART

It is known to monitor the characteristics of a tire through use of one or more Surface Acoustic Wave (SAW) sensors. Such sensors are generally mounted inside the tire and are electrically connected to an antenna by virtue of which signals may be communicated between the sensor and a remote transmitter/receiver. A problem associated with this prior art system is that, as the tire rotates in use, the sensor and associated antenna also rotate. Accordingly, the position of the sensor and antenna rapidly oscillates relative to the position of the transmitter/receiver and this can complicate interpretation of signals transmitted between the sensor and transmitter/receiver.

SUMMARY OF THE INVENTION

A first aspect of the present invention provides a wheel comprising a sensor electrically coupled to an electrical conductor within the structure of the wheel. The sensor may be a SAW sensor. The sensor may be capacitively coupled to the electrical conductor. The electrical conductor may be a rim of the wheel and/or elements within a tire mounted on the wheel. The tire elements may be reinforcing components within the tire. The tire elements may, for example, be a metal rim or braid. Furthermore, the sensor may be electrically coupled to the electrical conductor by means of a dipole or antenna. The dipole/antenna is preferably positioned within the wheel so as to excite an electromagnetic wave travelling around the wheel. The antenna may be a helical antenna.

A second aspect of the present invention provides a valve for a tire, wherein the valve comprises a sensor and dipole or antenna, wherein the dipole or antenna is electrically coupled to both the sensor and a body of the valve. The body of the valve is preferably metallic and adapted for connection with a wheel rim. Said connection may be an electrical connection.

BRIEF DESCRIPTION OF THE DRAWINGS

Embodiments of the present invention will now be described with reference to the accompanying drawings, in which.

DETAILED DESCRIPTION OF PREFERRED EMBODIMENTS

Figure 5:
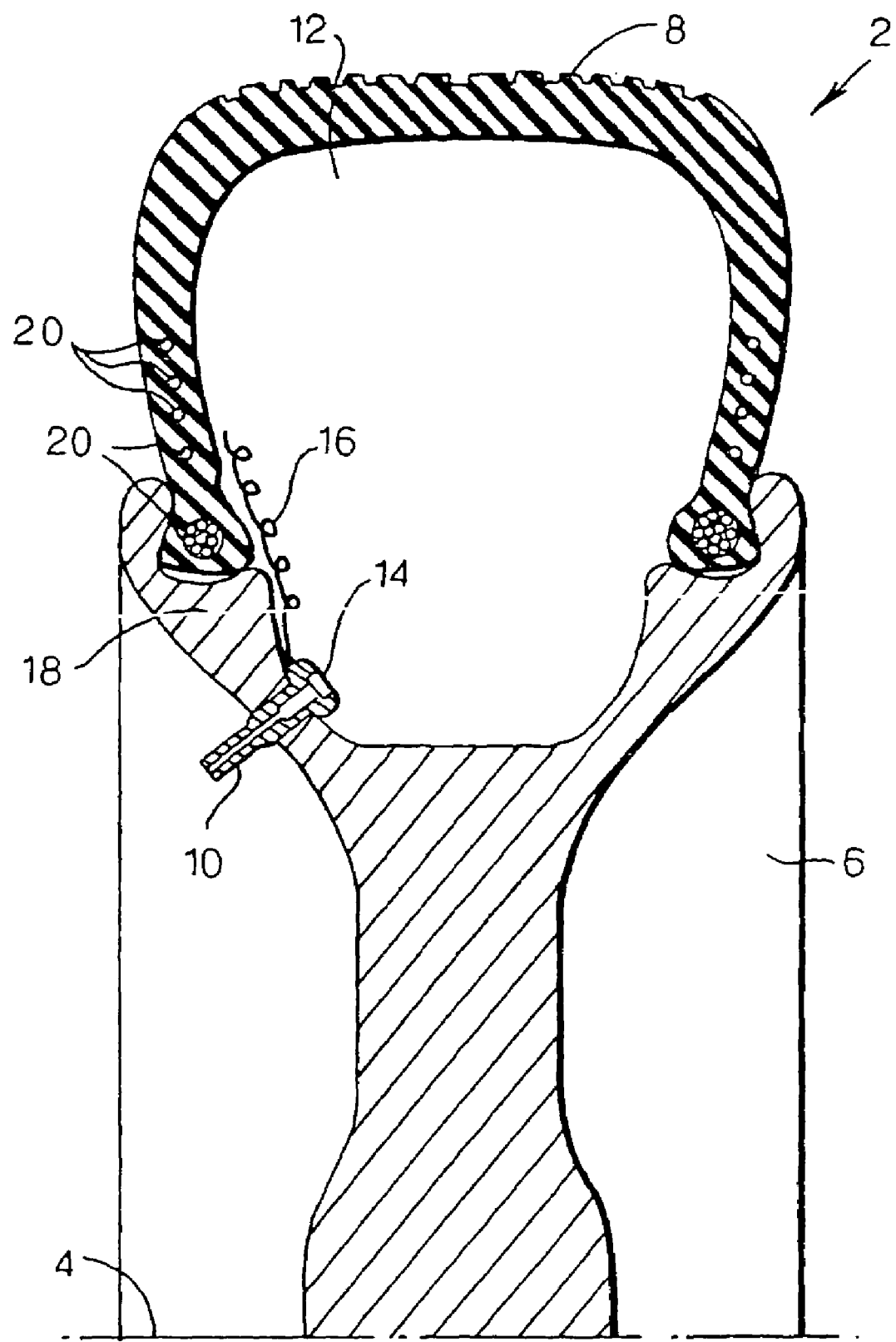
FIG. 5 is a cross-sectional partial view of a wheel according to the present invention.

A wheel 2 according to the present invention is shown in FIG. 5 of the accompanying drawings. The wheel 2 is shown in cross-section taken through a plane in which a rotational axis 4 of the wheel 2 lies. As the wheel 2 is symmetrical about the rotational axis 4, only the portion of wheel 2 located above the rotational axis 4 is shown in FIG. 5. The construction of a conventional automobile wheel will be well known to those skilled in the art and a detailed description thereof will not be necessary. Nevertheless, for the sake of completeness, it will be understood that the wheel 2 shown in FIG. 5 comprises a wheel hub 6 upon which a pneumatic tire 8 is mounted. A valve 10 extends through an aperture in the wheel hub 6 so as to allow air to be forced into the cavity 12 between the tire 8 and the hub 6. The valve 10 has a one-way characteristic so that air maybe admitted into the cavity 12 without being released therefrom (unless a release mechanism within the valve is activated). The tire 8 may be thereby conveniently inflated on the wheel hub 6.

In accordance with the present invention, the valve 10 is provided with a sensor (such as a SAW sensor) for monitoring characteristics such as tire pressure and temperature. A SAW sensor 14 is shown in FIG. 5 located in a slot defined in the body of the valve 10. The sensor 14 is electrically connected to a helical antenna 16 which itself is mechanically mounted to the body of the valve 10. The antenna 16 is located sufficiently close to the rim 18 of the hub 6 and the reinforcing elements 20 located within the tire side wall to induce an electro-magnetic wave therein. The antenna 16 may be located sufficiently close to the rim 18 and/or the reinforcing elements 20 so that the rim 18 and/or elements 20 lie within the near magnetic field generated by the antenna 16 when the sensor 14 activates.

Only some of the reinforcing elements 20 of the tire 8 are shown in FIG. 5 and those that are shown are illustrated in a schematic manner. A reader skilled in the art will be familiar with the arrangement of the reinforcing elements 20 in a pneumatic automobile tire.

Figure 1:
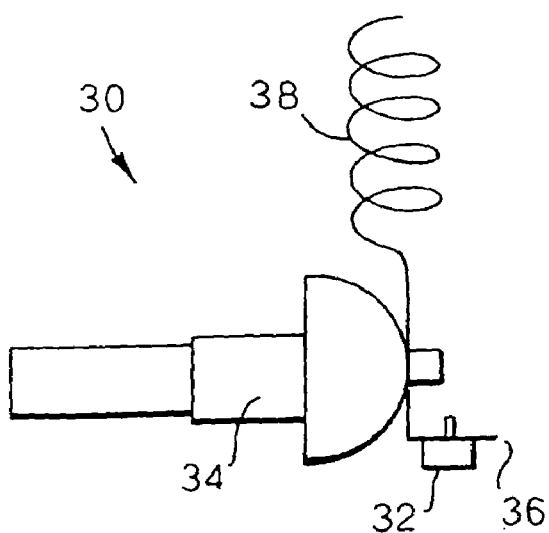
FIG. 1 is a first embodiment of the present invention.
Figure 2:
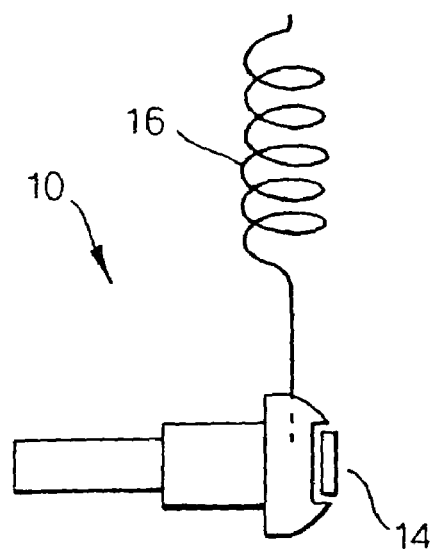
FIG. 2 is a second embodiment of the present invention.

An enlarged view of the valve 10 is shown in FIG. 2 of the accompanying drawings. As an alternative to the valve 10, the valve 30 shown in FIG. 1 of the accompanying drawings may be mounted to the wheel hub 6. It will be seen with reference to FIG. 1 that, rather than mounting the SAW sensor in a slot as in the case of the valve 10 shown in FIG. 2, the valve 30 shown in FIG. 1 comprises a SAW sensor 32 secured to the valve body 34 by means of a mounting bracket 36. The valve 30 of FIG. 1 also comprises a helical antenna 38 secured to the valve body 34 and electrically connected to the sensor 32.

With particular reference to FIGS. 1 and 2 it will be seen that in the case of each valve 30,10 a helical antenna 38 (or, alternatively, a short dipole) is mechanically attached to a valve and electrically connected to a SAW sensor. The location of the antenna/dipole and sensor is such that, when the valve is secured to a wheel, the antenna/dipole and sensor are located inside a tire mounted on the wheel rim. One terminal of the sensor is also connected to a metal body of the valve. In this way, the valve body may be employed as an RF "counterweight". Each valve may be capacitively coupled to a wheel rim. The dipole/antenna is positioned inside the tire in such a way that it excites an electromagnetic wave which travels around the tire as a result of reflections from the metal wheel rim and tire braid. Effectively, the tire operates as an electro-magnetic waveguide and spreads an electro-magnetic field across the whole tire. Accordingly, the tire walls radiate the electromagnetic wave around the whole circumference of the wheel. This is in contrast to use of a conventional antenna which operates as a point source. In the present invention, the entire wheel effectively operates as an antenna. This increases the sector within which a sensor can be excited by an interrogation pulse and considerably simplifies the interrogation process.

Figure 3A:
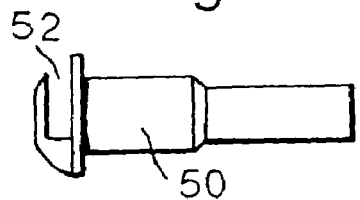
FIG. 3A is a side view of a valve body for use in connection with the present invention.
Figure 3B:
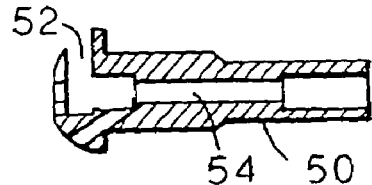
FIG. 3B is a cross-sectional side view of the valve body shown in FIG. 3A.
Figure 3C:
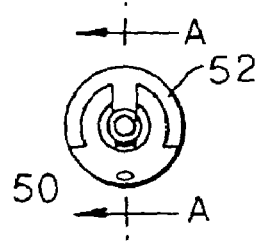
FIG. 3C is an end view of the valve body shown in FIG. 3A.
Figure 4A:
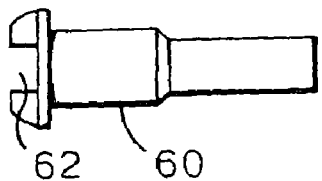
FIG. 4A is a side view of a further valve body for use in connection with the present invention.
Figure 4B:
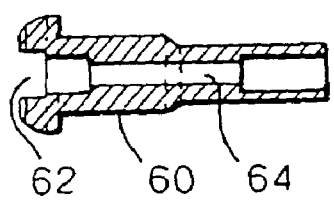
FIG. 4B is a cross-sectional side view of the valve body shown in FIG. 4A.
Figure 4C:
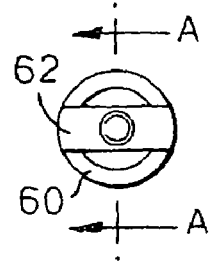
FIG. 4C is an end view of the valve body shown in FIG. 4A.

In the valve 30 of FIG. 1, the SAW sensor is mounted to the valve by means of a mounting bracket. However, in the valve 10 of FIG. 2, the SAW sensor is mounted directly on the valve body. Valve bodies suitable for directly receiving a sensor are illustrated in FIGS. 3 and 4 of the accompanying drawings. Each of the valve bodies 50,60 shown in FIGS. 3 and 4 respectively define a slot 52,62 in which a sensor may be located. Each slot 52,62 is defined in the associated valve body so as to cut across the air passageway 54,64 through which, in use, inflation air is admitted into the tire cavity 12 (see FIG. 5). In this way, when the sensor is located in the slot, inflation air passing through the valve passes around the sensor. The sensor is thereby exposed to the inflation air and may monitor the characteristics thereof. The slot 52,62 is also provided in that portion of the valve body which remains located within the tire cavity 12. In this way, the sensor may also monitor the characteristics of the air within the tire during a normal use of the associated wheel.

The present invention is not limited to the specific embodiments described above. Alternative arrangements will be apparent to those skilled in the art.

The invention claimed is:

1. A wheel comprising a sensor having an antenna electrically connected thereto, and at least two electrical conductors extending about a rotational axis of the wheel, wherein the antenna is electromagnetically coupled to a transmission line formed by the conductors, and the antenna is separate from the wheel and separate from a tire, said tire being attached to the wheel during use, and said antenna extending radially outwards from the wheel into a cavity which is defined between the wheel and the tire.

2. A wheel as claimed in claim 1, wherein said electrical conductors circumscribes the rotational axis of the wheel.

3. A wheel as claimed in claim 1, wherein said electrical conductors include a load-bearing component of the wheel structure.

4. A wheel as claimed in claim 3, wherein one of said electrical conductors comprises a tire supporting surface of the wheel.

5. A wheel as claimed in claim 4, wherein one of said electrical conductors comprises a circumferential tire retaining rim.

6. A wheel as claimed in claim 3, wherein said electrical conductor includes an element within the tire.

7. A wheel as claimed in claim 6, wherein said tire element is a tire reinforcing component.

8. A wheel as claimed in claim 6, wherein said tire element is a metal rim or braid.

9. A wheel as claimed in claim 1, wherein the antenna is mounted on a tire valve.

10. A wheel as claimed in claim 1, wherein the sensor is mounted on a tire valve.

11. A wheel as claimed in claim 10, wherein the sensor is electrically coupled to both the antenna and a body of the valve.

12. A wheel as claimed in claim 11, wherein the valve body is of a metallic material.

13. A wheel according to claim 11, wherein the valve body is electrically connected to the wheel.

14. A wheel according to claim 11, wherein the valve body is capacitively coupled to the wheel.

* * * * *

UNITED STATES PATENT AND TRADEMARK OFFICE
CERTIFICATE OF CORRECTION

PATENT NO.        : 7,185,535 B2
APPLICATION NO.   : 10/514962
DATED             : March 6, 2007
INVENTOR(S)       : John Peter Beckley et al.

It is certified that error appears in the above-identified patent and that said Letters Patent is hereby corrected as shown below:

Col. 4, line 36, claim 15 should be inserted and should read as follows:

15. A valve adapted for use in a wheel as claimed in claim 10.

Signed and Sealed this

Twenty-ninth Day of July, 2008

JON W. DUDAS
*Director of the United States Patent and Trademark Office*